United States Patent [19]

Petracek et al.

[11] Patent Number: 4,504,539

[45] Date of Patent: Mar. 12, 1985

[54] WARP YARN REINFORCED ULTRASONIC WEB BONDING

[75] Inventors: Vaclav Petracek, Bayside, N.Y.; Kenneth Y. Wang, Greensboro, N.C.

[73] Assignee: Burlington Industries, Inc., Greensboro, N.C.

[21] Appl. No.: 485,452

[22] Filed: Apr. 15, 1983

[51] Int. Cl.[3] ........................ B29C 27/08; B32B 31/20

[52] U.S. Cl. .................................. 428/195; 156/73.2; 156/296; 156/580.2; 428/293; 428/294; 428/296; 428/373

[58] Field of Search ..................... 156/73.1, 73.2, 176, 156/181, 296, 580.1, 580.2; 428/288, 293, 294, 296, 373, 195; 264/23

[56] References Cited

U.S. PATENT DOCUMENTS

| | | | |
|---|---|---|---|
| 3,239,401 | 3/1966 | Beery | 156/179 |
| 3,479,244 | 11/1969 | Burnett | 428/112 |
| 3,531,363 | 9/1970 | Shambelan | 428/110 |
| 3,966,519 | 6/1979 | Mitchell et al. | 156/73.1 |
| 4,001,472 | 1/1977 | Thomas et al. | 428/109 |
| 4,082,886 | 4/1978 | Butterworth et al. | 428/284 |
| 4,128,679 | 12/1978 | Pohland | 428/131 |
| 4,211,816 | 7/1980 | Booker et al. | 428/296 |
| 4,259,399 | 3/1981 | Hill | 428/288 |
| 4,285,748 | 8/1981 | Booker et al. | 156/167 |
| 4,296,168 | 10/1981 | Ambrose | 428/288 |
| 4,305,988 | 12/1981 | Kocher | 428/158 |
| 4,315,881 | 2/1982 | Nakajima et al. | 428/373 |
| 4,394,208 | 7/1983 | Wang et al. | 156/580.2 |
| 4,419,160 | 12/1983 | Wang et al. | 156/580.2 |

*Primary Examiner*—Michael Wityshyn
*Attorney, Agent, or Firm*—Cushman, Darby & Cushman

[57] ABSTRACT

A non-woven fabric is produced ultrasonically from a batt of ultrasonically fusible fibers and reinforcing yarns formed of bi-component fibers. The non-woven fabric produced has a layer of strong filament yarns integrated into the body of the non-woven fabric to increase the strength of the non-woven fabric without delamination of the components, and without degradation of the component yarns. The batt is continuously fed in a first direction toward and past a plurality of ultrasonic vibration sources and anvil means, which produce bonding sites in the fabric formed. A plurality of reinforcing yarns are taken-off a warp beam and laid atop the web prior to its passage into operative association with the vibration sources and anvil means. Energy is supplied to the vibration sources so that bonding of the fibrous batt into a non-woven fabric, and melting of the low-melt component of the reinforcing yarn fibers, takes place.

16 Claims, 9 Drawing Figures

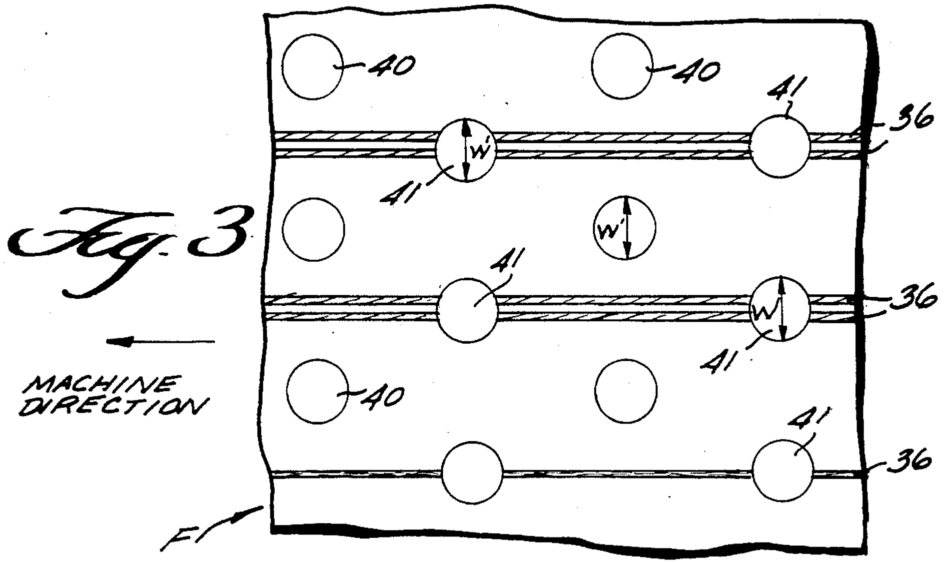
Fig. 3
Fig. 6a
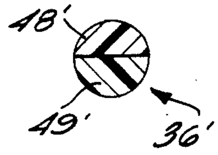
Fig. 6b
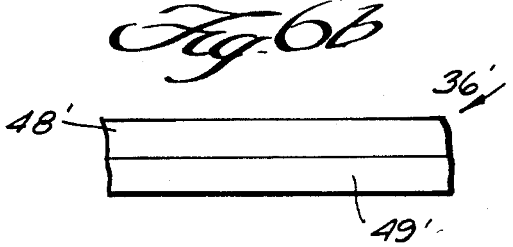
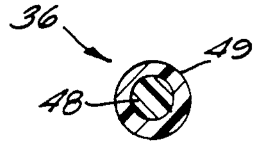
Fig. 5a
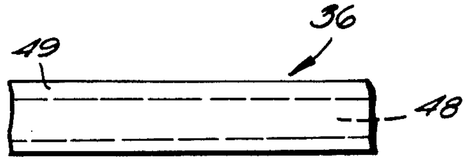
Fig. 5b

WARP YARN REINFORCED ULTRASONIC WEB BONDING

BACKGROUND AND SUMMARY OF THE INVENTION

In order for non-woven fabrics to have textile qualities, they must have two basic properties: strength, and soft hand. These two properties are usually mutually exclusive as a result of the characteristics of non-woven production processes. For instance in the production of non-woven fabrics ultrasonically, such as disclosed in U.S. Pat. No. 4,259,399, high bonding density to create acceptable strength usually results in degradation of the softness of the hand; and conversely, low bonding density yields soft hand but weak fabrics.

One proposal to produce a non-woven fabric ultrasonically having both good strength properties and soft hand is to provide reinforcement with a secondary scrim, which is a sheet of yarn relatively open in construction both in the machine direction and the cross-machine direction. However there are great difficulties in practicing this technique, and if the reinforcing scrims are not actually bonded at the bonding points, delamination takes place easily. If actual bonding takes place between the web and the scrim, the bond points are usually thermally degraded to the extent that very minimal bond strength still remains.

According to the present invention a method is provided for bonding reinforcing yarns to a web, during ultrasonic production of non-woven fabric, without inadvertently destroying the strength of the reinforcing yarns. This is accomplished by introducing reinforcing yarns formed of bi-component fibers in the warp direction prior to the passage of a batt of primarily ultrasonically fusible fibers into operative association with a plurality of ultrasonic vibration sources and anvil means cooperating with the vibration sources. The term "reinforcing yarn of bicomponent fibers" as used in the present specification and claims means: yarns having fibers wherein one component is a strong filament fiber, and provides reinforcement to an ultimate non-woven fabric being formed, and has a relatively high melting point; while the other component of the fiber has a relatively low melting point. The yarns may be either spun from staple fibers, or continuous filament yarns.

A non-woven fabric also is provided according to the present invention. The non-woven fabric produced includes a layer of strong filament reinforcing yarns integrated into the body of the non-woven fabric. This provides an increase in the strength of the non-woven fabric without delamination of the components and without degradation of the component yarns. The reinforcing yarn is formed of bi-component fibers. The production of the non-woven fabric according to the present invention is accomplished utilizing a plurality of ultrasonic vibration sources and anvil means, and feeding the batt—with reinforcing yarns laid on top of it—into operative association with the vibration sources and anvil means.

It is the primary object of the present invention to provide a non-woven fabric having good strength and hand properties, and an ultrasonic method of production thereof. This and other objects of the invention will become clear from an inspection of the detailed description of the invention, and from the appended claims.

BRIEF DESCRIPTION OF THE DRAWINGS

FIG. 3 is a top plan schematic view showing the interrelationship between bond points and reinforcing yarns in a non-woven fabric according to the present invention;

FIGS. 5*a* and 5*b* are end and side views, respectively, of one type of bi-component fiber utilizable to form the reinforcing yarn according to the present invention; and FIGS. 6*a* and 6*b* are end and side views, respectively, of another type of bi-component fiber that may be utilized in practicing the invention.

DETAILED DESCRIPTION OF THE DRAWINGS

Figure 1:
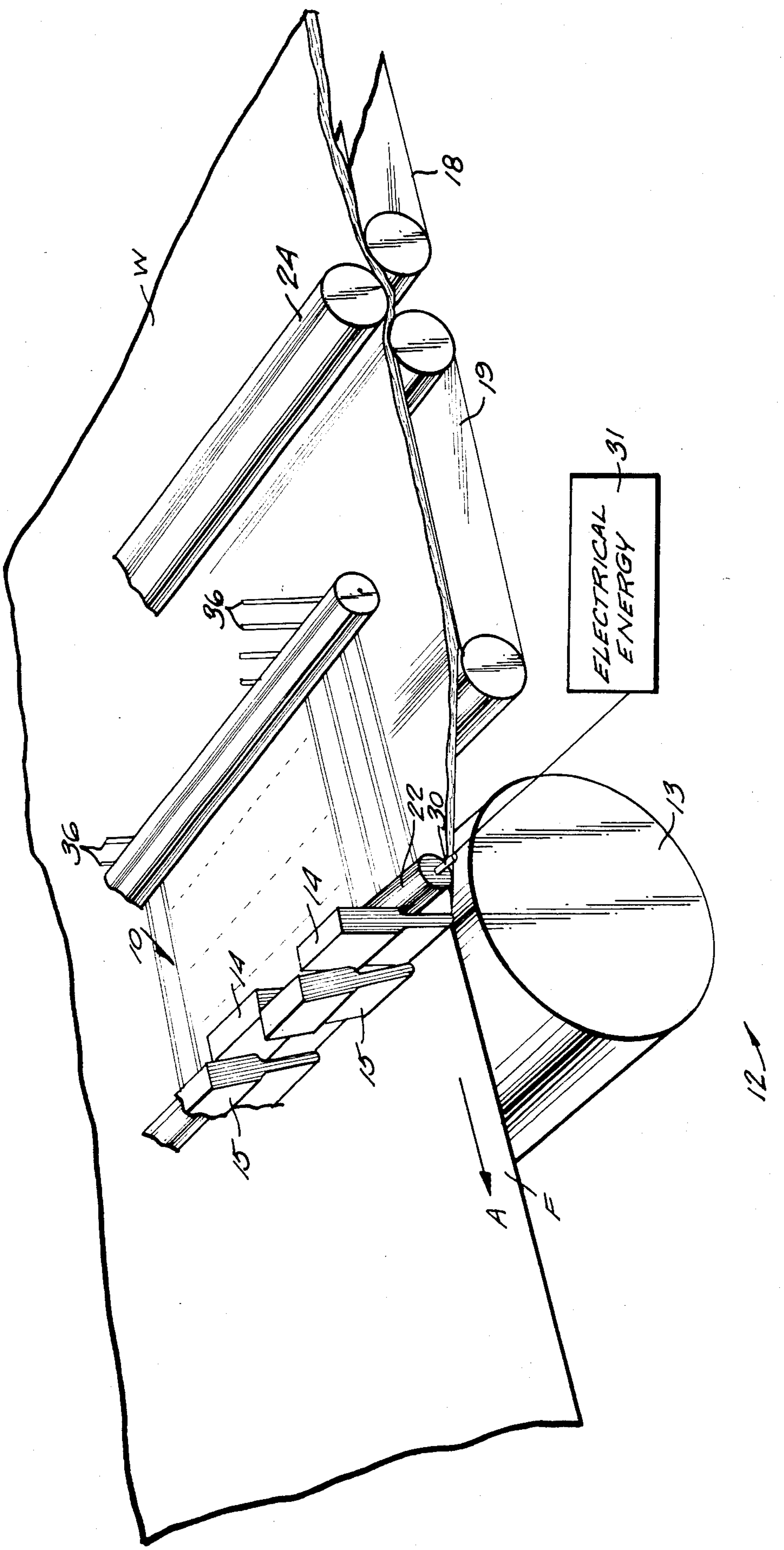
FIG. 1 is a partial perspective schematic view of exemplary apparatus for producing a non-woven fabric, and practicing the method, according to the present invention.
Figure 2:
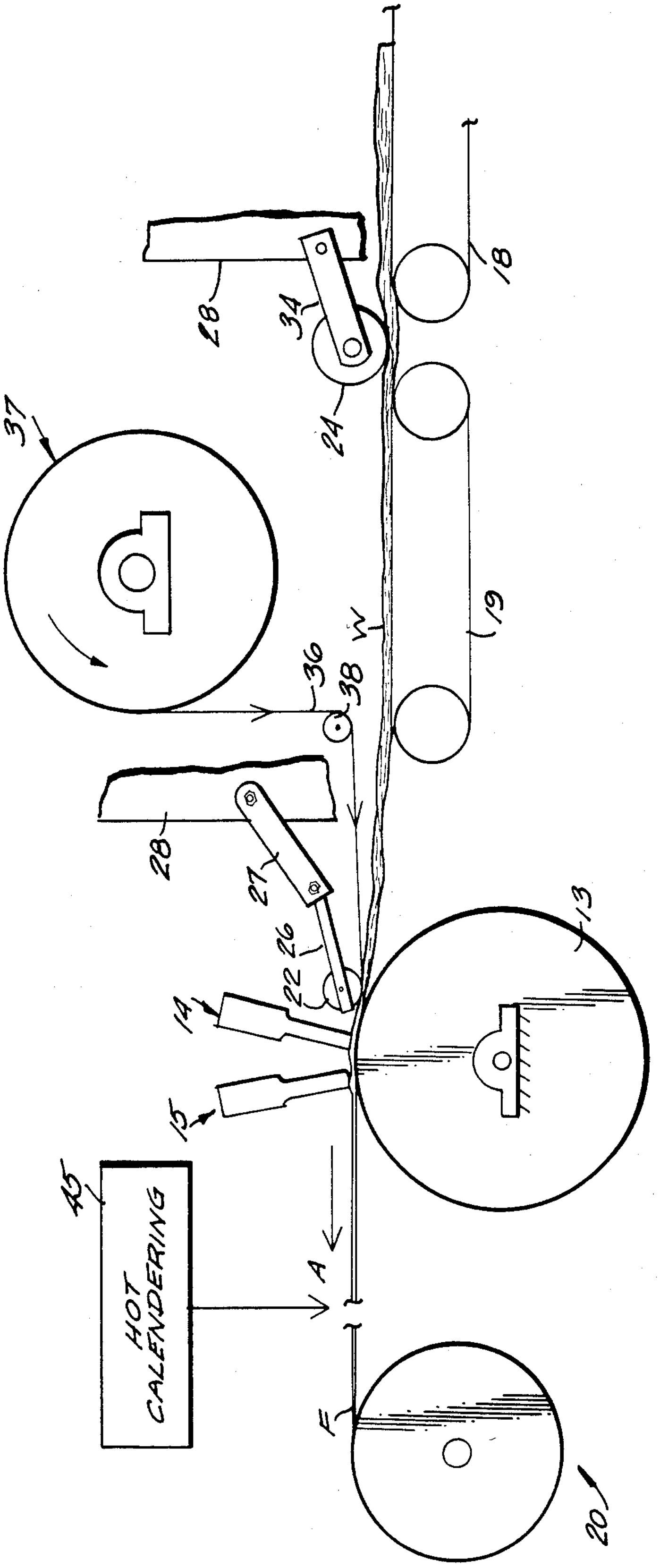
FIG. 2 is a side schematic view of the apparatus of FIG. 1, also showing further components.

The basic apparatus illustrated in FIGS. 1 and 2 is preferably of the type illustrated in copending application Ser. No. 290,714 filed Aug. 6, 1981, now U.S. Pat. No. 4,394,208 the disclosure of which is hereby incorporated by reference herein. The anvil means associated with the apparatus may be as described in U.S. Pat. No. 4,259,399. While such apparatus is preferred, other apparatus may be suitable for practicing the method, and producing the non-woven fabric, according to the present invention.

The apparatus includes a plurality of conventional ultrasonic vibration sources shown generally by reference numeral 10, and anvil means—shown generally by reference numeral 12—cooperating with the vibration sources 10 to effect bonding. One configuration that is particularly useful comprises an engraved roll 13 as the anvil means 12, and a plurality of staggered horns 14, 15, disposed in a first row and in a second row, respectively, as the vibration sources 10. A means is provided for transporting the web W, which comprises a batt of primarily ultrasonically fusible fibers, in a first direction (machine direction) A past, and between, the vibration sources 10 and the anvil means 12, the transporting means in the exemplary embodiment illustrated comprising a vacuum screen conveyor 18, a conveyor belt 19, and a take-up assembly 20 for taking up the non-woven fabric F produced.

A stainless steel roller 22, or the like, may be provided for compressing the fibers of the web W just prior to passage into operative association with the horns 14, 15. The roller 22 may be mounted by a pair of sets of levers 26, 27, one set of levers being mounted on each side of the roller 22, and the levers 27 pivotally mounted to the machine frame 28 at one end thereof. To provide heat to the fibers of the web W just prior to passage into contact with the horns 14, 15—to facilitate compression and deformation of the fibers of the web—heating means may be provided. As illustrated schematically in FIG. 1, a stationary electrically conductive rod 30 may pass through the roller 22, the rod 30 being supplied with electrical energy by source 31 so that the surface temperature of the roller is elevated. If desired, a second roller 24 may be provided upstream of the roller 22, the roller 24 being mounted by lever 34 to frame 28, and providing some compression of the web W fibers.

Figure 4A:
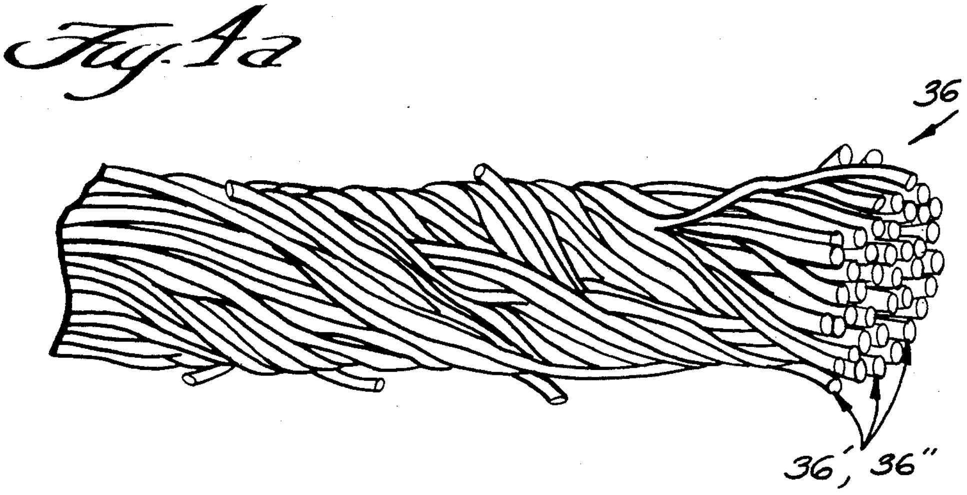
FIGS. 4*a* and 4*b* are perspective schematic views of two different embodiments of reinforcing yarn utilizable in the practice of the invention.
Figure 4B:
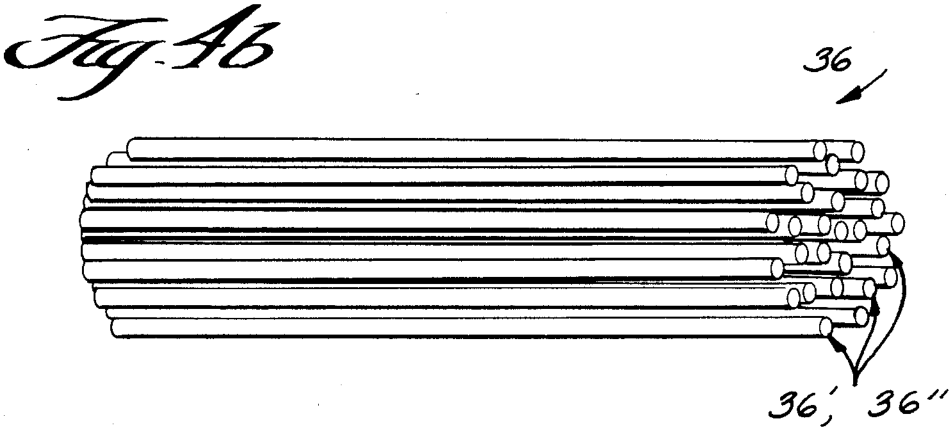

Facilitating practice of the present invention, means are provided for warp insertion (i.e. in direction A) of a plurality of reinforcing yarns 36, which may be either spun yarn (see FIG. 4*a*) or continuous filament yarn (see FIG. 4*b*). The yarns 36 are formed from bi-component fibers, such as conventionally available bi-component fibers, like Hetrofil and Chisso ES fibers. The size of the yarn 36 determines the strength and final thicknesses and weights of the composite structures used.

In normal operations, the existing bond points 40, 41 occupy about 15 percent of the total bond area, and provide sufficient bond densities for adequate lamination. However, in a very light warp where reinforcing yarns 36 are far apart, a conventional hot calendering action may be utilized to increase the number of bond sites for the reinforcing yarns 36. A hot calendering station is shown schematically by reference numeral 45 in FIG. 2.

Different configurations bi-component fibers making up the yarns 36 could take are shown in FIGS. 5 and 6. For instance the fiber 36" in FIGS. 5*a* and 5*b* includes a core component 48 comprising a strong filament component having a relatively high melting temperature, and a shell 49 of relatively low metling temperature thermoplastic material. For the fiber 36' illustrated in FIGS. 6*a* and 6*b*, a side-by-side configuration of the high and low temperature components is provided. The high temperature component 48' comprises substantially half of the entire configuration of the fiber 36', while the low temperature component 49' comprises substantially the other half.

The yarns 36 are introduced into operative association with the web W prior to the passage of the web into operative association with the vibration sources 10 and anvil means 12. This is preferably accomplished by mounting a conventional warp beam 37, having a plurality of lengths of yarns 36 associated therewith, above the web W. The yarns 36 are let-off from the warp beam 37, pass into operative contact with the direction-changing roller 38 (the axis of rotation of which is preferably stationarily—although adjustably—mounted with respect to the frame 28), and then pass substantially in direction A to lay atop the web. W. The compression roller 22 compresses the fibers of the web W, and additionally presses the bi-component reinforcing yarns 36 into operative association with the web W, prior to the web W moving into operative association with the horns 14, 15.

Engraved projections on the anvil roll 13 cooperate with the horns 14, 15 to provide bond points 40, 41 in the non-woven fabric F produced (see FIG. 3). The yarns 36 are introduced so that they are in operative association with at least some of the bond points 40, 41. For instance in FIG. 3, a plurality of yarns 36 are shown in operative association with the top two sets of the bond sites 41, one yarn 36 is shown in association with the lower set of bond sites 41, and none are shown in operative association with the bond sites 40. Any arrangement of reinforcing yarns 36 with bond sites 40, 41 may be provided that produces the non-woven fabric F having the desired textile properties (strength and hand).

As illustrated in FIG. 3, normally the bond points 40, 41 have a substantially greater width W' than the diameter of the reinforcing yarns 36. For instance conventionally the bi-component reinforcing yarns 36 would have a diameter of about 5–20 mils, whereas the width W' would normally be about 10–30 mils. As illustrated in FIG. 3, at the bond sites 41, the low melting temperature component of the fibers forming the reinforcing yarns 36 is melted, whereas the high melting temperature component remains substantially unaffected, the low-melt component acting as an adhesive holding the high-melt component in integral association with the body of the non-woven fabric F.

In practicing the method of the present invention, a method of ultrasonically bonding a fibrous batt web into a non-woven fabric is provided, utilizing the ultrasonic vibration sources 10 and anvil means 12 cooperating therewith, the structures 10, 12 providing discrete bond sites 40, 41 in the non-woven fabric F produced. The method is practiced by: (a) Continuously feeding a batt W of primarily ultrasonically fusible fibers in a first direction A toward and past the vibration sources 10 and anvil means (12). (b) Laying a plurality of reinforcing yarns in the warp direction prior to movement of the web into operative association with the vibration sources and anvil means, the reinforcing yarns being in-line with at least some of the bond sites 40, 41 provided by the vibration sources 10 and anvil means 12. And, (c) supplying energy to the vibration sources 10 so that bonding of the fibrous batt W into a non-woven fabric F takes place at the location of the vibration sources and anvil means, and so that the low melting temperature component 49, 49' of the bi-component fibers 36, 36' forming the yarns 36 melts at the bonding point 40, 41 while the higher melt component 48, 48' of the bi-component fibers 36", 36' remains substantially unaffected, so that the reinforcing yarns 36 effect reinforcement of the formed non-woven fabric.

When the roller 22 is utilized, the fibers of the web W are compressed, and the yarns 36 pressed into association therewith, just prior to passage of the batt W into contact with any of the vibration sources 10. When the roller 22 is heated, the fibers in the web W, and the yarns 36, are heated just prior to passage into operative association with the vibration sources 10 in order to facilitate compression and deformation thereof.

Step (b) is preferably practiced by letting off a plurality of reinforcing yarns 36 from a warp beam 37, and changing the direction thereof by roll 38 so that they pass in the direction A, atop the web W, just prior to passage into operative association with the horns 14, 15. In a very light warp where the yarns 36 are far apart, a hot calendering action is provided at station 45 to increase the number of bond sites for the reinforcing yarns 36.

A non-woven fabric according to the present invention is produced ultrasonically, as described above. The non-woven fabric according to the present invention includes a layer of yarns 36 integrated into the body of the non-woven fabric F to increase the strength thereof without delamination of the components, and without degradation of the component yarns.

It will thus be seen that according to the present invention a non-woven fabric having good textile qualities (good strength and soft hand), and a method of production thereof, have been provided. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and fabrics.

What is claimed is:

1. A non-woven fabric produced by the method of: making a warp reinforced ultrasonically bonded fabric utilizing a plurality of ultrasonic vibration sources and an anvil means cooperating with the vibration sources to provide discrete bond sites in the fabric, the method comprising the steps of: continuously feeding a batt of primarily ultrasonically fusible fibers in a first direction toward and past the vibration sources and anvil means; laying a plurality of reinforcing yarns formed of bi-component fibers, each having a low melting temperature component and a high melting temperature component, in the warp direction prior to movement of the web into operative association with the vibration sources and anvil means, the reinforcing yarns in-line with at least some of the bond sites provided by the vibration sources and anvil means; and supplying energy to the vibration sources so that bonding of the fibrous batt into a non-woven fabric takes place at the location of the vibration sources and anvil means, and so that the low melting temperature component of the reinforcing yarn fibers melts at the bonding sites to effect adhesion of the high melting temperature component to the fibrous batt, while the high melting temperature component of the reinforcing yarn fibers remains substantially uneffected, so that the reinforcing yarns effect reinforcement of the formed non-woven fabric.

2. A non-woven fabric as recited in claim 1 produced by the further method step of: compressing the fibers of the fibrous batt, and pressing the reinforcing yarns into the fibrous batt, just prior to passage of the batt and reinforcing yarns into contact with any of the vibration sources.

3. A method of making a warp reinforced ultrasonically bonded fabric utilizing a plurality of ultrasonic vibration sources and an anvil means cooperating with the vibration sources to provide discrete bond sites in the fabric, the method comprising the steps of:

(a) continuously feeding a batt of primarily ultrasonically fusible fibers in a first direction toward and past the vibration sources and anvil means;

(b) laying a plurality of reinforcing yarns formed of bi-component fibers, each having a low melting temperature component and a high melting temperature component, in the warp direction prior to movement of the web into operative association with the vibration sources and anvil means, the reinforcing yarns in-line with at least some of the bond sites provided by the vibration sources and anvil means; and (c) supplying energy to the vibration sources so that bonding of the fibrous batt into a non-woven fabric takes place at the location of the vibration sources and anvil means, and so that the low melting temperature component of the reinforcing yarn fibers melts at the bonding sites to effect adhesion of the high melting temperature component to the fibrous batt, while the high melting temperature component of the yarn fibers remains substantially uneffected, so that the reinforcing yarns effect reinforcement of the formed non-woven fabric.

4. A method as recited in claim 3 wherein step (b) is practiced by supplying a plurality of reinforcing yarns for each bond site with which reinforcing yarns are associated.

5. A method as recited in claim 4 wherein the diameter of each of the reinforcing yarns is about 5–20 mils, and wherein each bond site has a width of about 10–30 mils.

6. A method as recited in claim 4 wherein step (b) is practiced by positioning a warp beam above the fibrous batt, and taking-off the reinforcing yarns from the warp beam and directing them so that they move in the same direction as the fibrous batt prior to passage thereof into operative association with the vibration sources and anvil means.

7. A method as recited in claim 3 wherein step (b) is practiced by providing reinforcing yarns in association with some, but not all, of the bond sites.

8. A method as recited in claim 3 wherein the diameter of each of the reinforcing yarns is about 5–20 mils, and wherein each bond site has a width of about 10–30 mils.

9. A method as recited in claim 3 comprising the further step of compressing the fibers of the fibrous batt, and pressing the reinforcing yarns into the fibrous batt, just prior to passage of the batt and reinforcing yarns into contact with any of the vibration sources.

10. A method as recited in claim 9 comprising the further step of heating the fibers of the fibrous batt, and the reinforcing yarns, just prior to passage into contact with the vibration sources, to facilitate compression and deformation thereof.

11. A method as recited in claim 9 wherein step (b) is practiced by positioning a warp beam above the fibrous batt, and taking-off the reinforcing yarns from the warp beam and directing them so that they move in the same direction as the fibrous batt prior to passage thereof into operative association with the vibration sources and anvil means.

12. A method as recited in claim 3 wherein step (b) is practiced by positioning a warp beam above the fibrous batt, and taking-off the reinforcing yarns from the warp beam and directing them so that they move in the same direction as the fibrous batt prior to passage thereof into operative association with the vibration sources and anvil means.

13. A method as recited in claim 3 wherein the reinforcing yarns are made from fibers having core-shell components, the core comprising a high-melt component and the shell comprising a low-melt component.

14. A method as recited in claim 3 wherein the reinforcing yarns are made from fibers containing side-by-side components, a high-melt component and a low-melt component each comprising substantially a continuous half of the reinforcing yarn.

15. A method as recited in claim 3 wherein the reinforcing yarns are spaced relatively far apart; and comprising the further step (d) of subjecting the nonwoven fabric formed to a hot calendering action to increase the number of bond sites for the reinforcing yarn.

16. A method as recited in claim 15 consisting of steps (a)–(d).

* * * * *